(12) United States Patent
Nunn

(10) Patent No.: US 11,440,459 B1
(45) Date of Patent: Sep. 13, 2022

(54) CARGO LOAD RESTRAINING DEVICE

(71) Applicant: Marvin Nunn, Cypress, TX (US)

(72) Inventor: Marvin Nunn, Cypress, TX (US)

( * ) Notice: Subject to any disclaimer, the term of this patent is extended or adjusted under 35 U.S.C. 154(b) by 231 days.

(21) Appl. No.: 17/004,210

(22) Filed: Aug. 27, 2020

(51) Int. Cl.
| | | |
|---|---|---|
| *B60P 7/08* | (2006.01) | |
| *B60P 7/15* | (2006.01) | |
| *B62D 33/08* | (2006.01) | |
| *B60R 9/06* | (2006.01) | |
| *B60P 3/40* | (2006.01) | |
| *B60P 7/14* | (2006.01) | |
| *B60P 7/12* | (2006.01) | |

(52) U.S. Cl.
CPC ........ *B60P 7/15* (2013.01); *B60P 3/40* (2013.01); *B60P 7/12* (2013.01); *B60P 7/14* (2013.01); *B60R 9/06* (2013.01); *B62D 33/08* (2013.01)

(58) Field of Classification Search
CPC ...... B60P 7/15; B60P 7/12; B60P 7/14; B60P 7/08; B60P 3/40
USPC ....... 410/2, 32, 34, 120, 121, 127, 129, 140, 410/143, 155
See application file for complete search history.

(56) References Cited

U.S. PATENT DOCUMENTS

| | | | |
|---|---|---|---|
| 5,433,566 A * | 7/1995 | Bradley | B60P 7/15 410/121 |
| 5,522,685 A * | 6/1996 | Lessard | B60P 7/14 410/121 |
| 6,609,743 B1 | 8/2003 | Stevenson | |
| 6,632,055 B2 * | 10/2003 | Kania | B60P 3/40 410/34 |
| 7,740,430 B2 * | 6/2010 | Mchugh | B60P 3/40 410/121 |
| 7,862,268 B2 * | 1/2011 | Dibner | B60P 3/40 410/121 |
| 8,240,963 B2 * | 8/2012 | Estrada | B61D 45/001 410/121 |
| 9,956,996 B2 | 5/2018 | Astrike | |
| 2008/0031700 A1 * | 2/2008 | Dibner | B60P 3/40 410/129 |

\* cited by examiner

*Primary Examiner* — Stephen T Gordon

(74) *Attorney, Agent, or Firm* — Sanchelima & Associates, P.A.; Christian Sanchelima; Jesus Sanchelima

(57) ABSTRACT

A system for a truck bed extender including a shield assembly, a frame assembly and a vehicle assembly is disclosed. The shield assembly includes a shield that is secured to a frame of the frame assembly. The frame is secured to a truck bed of a vehicle with mounting members. The shield includes a first shield portion and a second shield portion that are slidably attached together by a shield pin. The shield has an L shaped configuration to prevent items from sliding off of the truck bed. The shield provides protection to the top of the truck bed. The second shield portion is adjustable in length to secure items of different lengths onto the truck bed. The frame is adjustable in height to help accommodate and secure items of different heights onto the truck bed with the shield.

19 Claims, 3 Drawing Sheets

CARGO LOAD RESTRAINING DEVICE

BACKGROUND OF THE INVENTION

1. Field of the Invention

The present invention relates to a cargo load restraining device and, more particularly, to a cargo load restraining device that helps to secure items on a truck bed that extend beyond the lowered rear tailgate.

2. Description of the Related Art

Several designs for cargo load restraining devices have been designed in the past. None of them, however, include a truck bed cover and bed extender comprising a two-piece adjustable aluminum shield, a pair of vertically extendable arms pivotally attached to the truck bed rails, a horizontal bar which connects the pivoting arms to which is mounted the shield.

Applicant believes that a related reference corresponds to U.S. Pat. No. 9,956,996 for a cargo bed extension assembly including cover for a tailgate. Applicant believes that another related reference refers to U.S. Pat. No. 6,609,743 for a vehicle bed extender unit with protective top cover sheet. None of these references, however, teach of a two-piece adjustable shield that helps to maintain items secured to the truck bed.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a cargo load restraining device that helps to better secure items onto a truck bed.

It is another object of this invention to provide a cargo load restraining device that provides cover to a truck bed and items secured thereon.

It is still another object of the present invention to provide a cargo load restraining device that helps to increase the safety of surrounding drivers and pedestrian.

It is also another object of the present invention to provide a cargo load restraining device that is adjustable to accommodate different sized loads.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
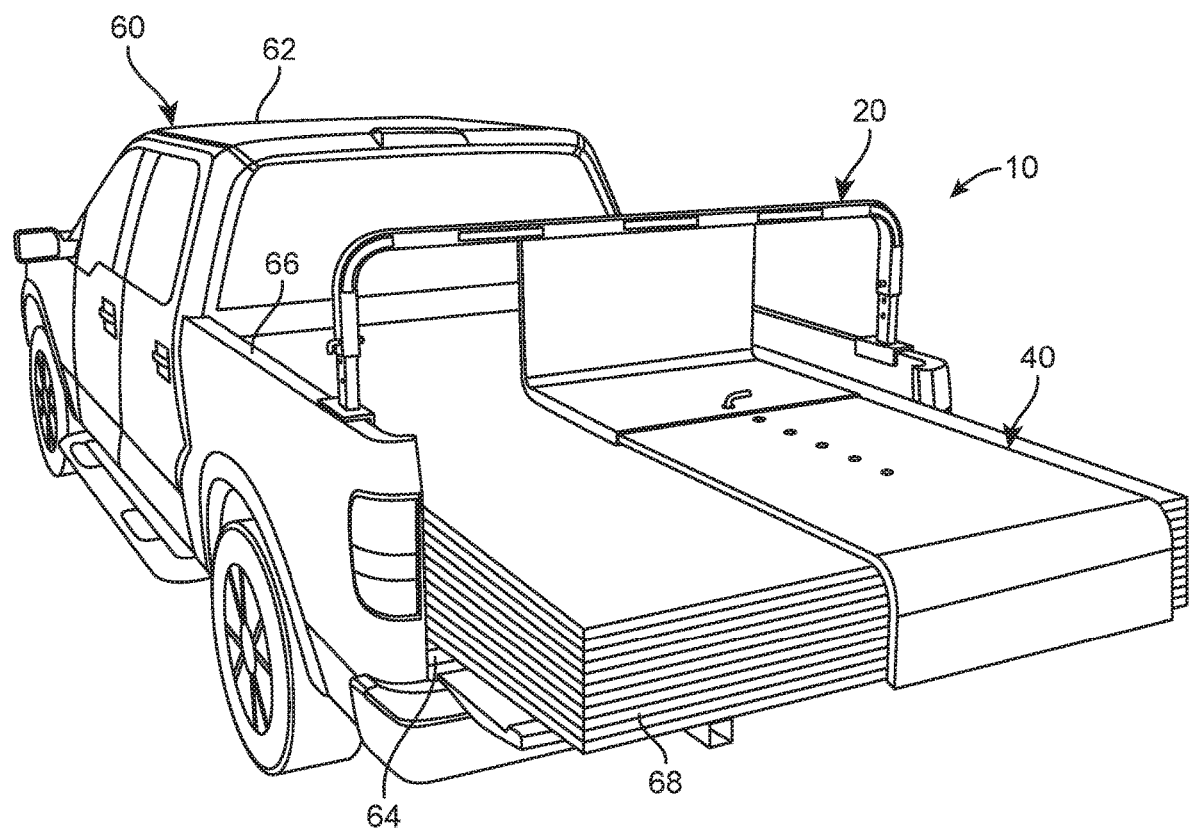
FIG. 1 represents an operational view of cargo load restraining device 10 secured onto a vehicle 62 of the vehicle assembly 60.
Figure 2:
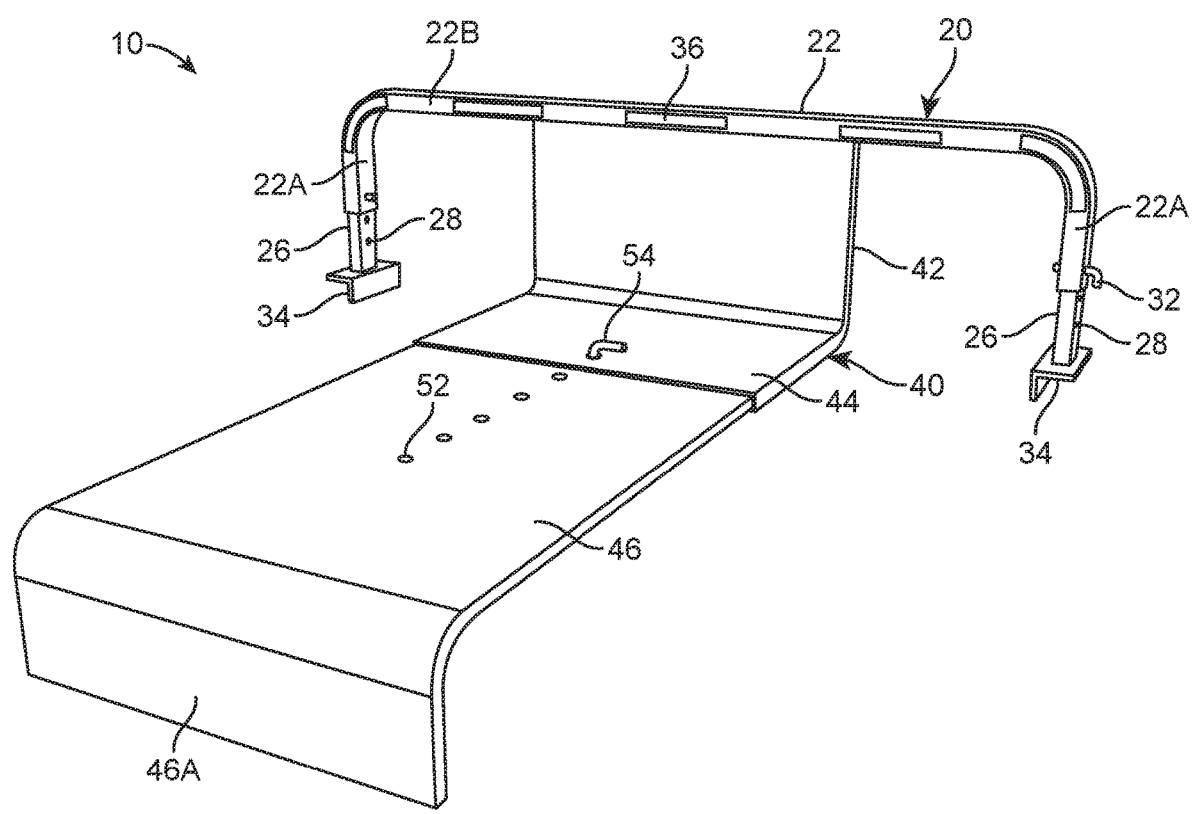
FIG. 2 shows an isometric view of truck bed extender 10.

Referring now to the drawings, where the present invention is generally referred to with numeral 10, it can be observed that a cargo load restraining device 10 basically includes a frame assembly 20, shield assembly 40, and a vehicle assembly 60.

There is often a need to transport an oversized cargo between locations. Securing the cargo during transportation is crucial to avoid catastrophes and injuries. As crucial as securing the cargo properly is, it is difficult to achieve. The oversize cargo seldomly fits entirely on vehicles used for transportation. This adds to the difficulties of securing the cargo down properly.

As best seen in FIG. 1, frame assembly 20 may be secured to vehicle assembly 60. Frame assembly 20 may include a frame 22. Frame 22 may be removably secured to a vehicle 62 of vehicle assembly 60. More specifically, frame 22 may be entirely above of a truck bed 64 and truck bed rails 66 of vehicle 62. Frame 22 may be substantially U shaped. Frame 22 may be made of square tubing, in one embodiment. It may be preferable for frame 22 to be made of materials such as metal, rubber, wood, aluminum, plastic or the like. Frame 22 may be further defined by vertical bars 22a and horizontal bar 22b. It is to be understood that vertical bars 22a may extend downwardly from distal ends of horizontal bar 22b. Horizontal bar 22b may be entirely between vertical bars 22a. It is to be understood that vertical bars 22a and horizontal bar 22b may be integral with each other. Frame 22, more specifically, vertical bars 22a may each include a frame opening 24. It is to be understood frame 22 may include multiple of frame opening 24 defined as frame openings. Each of frame opening 24 may be used when adjusting the height of frame 22. Frame opening 24 may be on lateral sides of vertical bars 22a.

It is to be understood that slidably received within frame 22 may be arms 26. Arms 26 may be received at an underside of frame 22. Arms 26 may be slidably received within vertical bars 22a. Arms 26 may be partially covered by frame 22. Arms 26 may be adapted to adjust frame 22 vertically as needed to accommodate a load 68 of vehicle assembly 60 mounted on truck bed 64. Each of arms 26 may include arm openings 28. Arm openings 28 may be on lateral sides of arms 26. Preferably, arm openings 28 may extend vertically in line on a same vertical plane along arms 26. Arm openings 28 may be evenly spaced apart and parallel to each other. Arm openings 28 may be used to permit adjusting the height of frame 22.

Importantly, frame opening 24 on each of vertical bars 22a may cooperate with arm openings 28 when the height of frame 22 is being adjusted. Frame opening 24 and arm openings 28 may be parallel to each other. A frame pin 32 may be used to interconnect frame 22 and arms 26 together. It is to be understood that frame pin 32 may be L shaped in the preferred embodiment. It is to be understood that two of frame pin 32 may be suitable for the present invention. Frame pin 32 may secure frame 22 to arms 26 at the necessary height for frame 22. Frame opening 24 may be lined with the desired of arm openings 28 that corresponds with the desired height of frame 22, subsequently frame pin 32 may be inserted therethrough. Resulting in frame 22 and arms 26 being secured together at the desired height for frame 22. Frame pin 32 may be inserted perpendicularly to frame 22 and arms 26. The distal ends of frame pin 32 may be partially visible when frame pin 32 is secured to frame 22 and arms 26.

To allow frame assembly 20 to be removably mounted onto vehicle 62, mounting members 34 may be used. Mounting members 34 may be pivotally attached to vehicle 62. Mounting members 34 may be mounted to arms 26. Mounting members 34 may be entirely underneath of arms 26. In one embodiment, arms 26 and mounting members 34 may be integral with each other. Mounting members 34 may have an L shaped configuration, preferably. Mounting members 34 may be perpendicular to arms 26. It may be preferable for mounting members 34 to be outwardly facing towards lateral sides of the present invention. The length and width of mounting members 34 may be greater than that of arms 26. Mounting members 34 may be then be secured in abutting contact with truck bed rails 66 to elevate frame assembly 20 over truck bed 64. Mounting members 34 may be secured to an inner and upper side of truck bed rails 66. Fasteners or other securing means may be used to attach mounting members 34 to truck bed rails 66.

For added safety, reflectors 36 may be mounted onto frame 22 at predetermined locations. It may be preferable for reflectors 36 to be facing towards shield assembly 40. It may be suitable to attach reflectors 36 to frame 22 with adhesives or other attaching means. Reflectors 36 may help to increase visibility of vehicle 62 in dark areas. Reflectors 36 may be evenly spaced apart on frame 22. Some of reflectors 36 may be horizontal and straight. Others of reflectors 36 may curve along frame 22. Reflectors 36 may be in constant abutting contact with frame 22.

Mounted to frame 22 may be shield assembly 40. Shield assembly 40 may provide coverage for load 68. Additionally, shield assembly 40 may secure load 68 onto truck bed 64. Shield assembly 40 may include a shield 42. Shield 42 may preferably be used to ensure that load 68 remains secured onto vehicle 62. Shield 42 may be secured to an underside of frame 22. Shield 42 may be entirely above of said truck bed 64. Load 68 may be in abutting contact with shield 42 when secured on truck bed 64. Preferably, shield 42 is centrally located on frame 22. Shield 42 may have a substantial Z shape. Importantly, shield 42 may be adjustable in length to accommodate and secure load 68 properly. Load 68 may extend beyond the length of truck bed 64, shield 42 may accommodate such length. It may be suitable for shield 42 to be made of materials such as metal, plastic, aluminum, wood, plastic or the like. As best seen in FIG. 1, shield 42 may extend a partial width and length of truck bed 64. Shield 42 may be further defined by a first shield portion 44 and a second shield portion 46. First shield portion 44 may be attached to frame 22. It can be seen that first shield portion 44 may be L shaped. First shield portion 44 may extend towards a rear of vehicle 62. Second shield portion 46 may be L shaped. Second shield portion 46 may be slidably received within first shield portion 44 for adjusting the length of shield 42. It is to be understood that first shield portion 44 may partially enclose second shield portion 46 therein. First shield portion 44 may preferably be hollow and second shield portion 46 may preferably be solid. Together, first shield portion 44 and second shield portion 46 help to keep load 68 secured onto truck bed 64. It is to be understood that second shield portion 46 and load 68 may extend beyond a perimeter of truck bed 64.

Second shield portion 46 may include a front member 46A that may be used to prevent load 68 from sliding off of truck bed 64. Front member 46A may extend perpendicularly and downwardly from second shield portion 46. Front member 46A may be in abutting contact with a distal end of load 68. Front member 46A may be integral with second shield portion 46.

Figure 3:
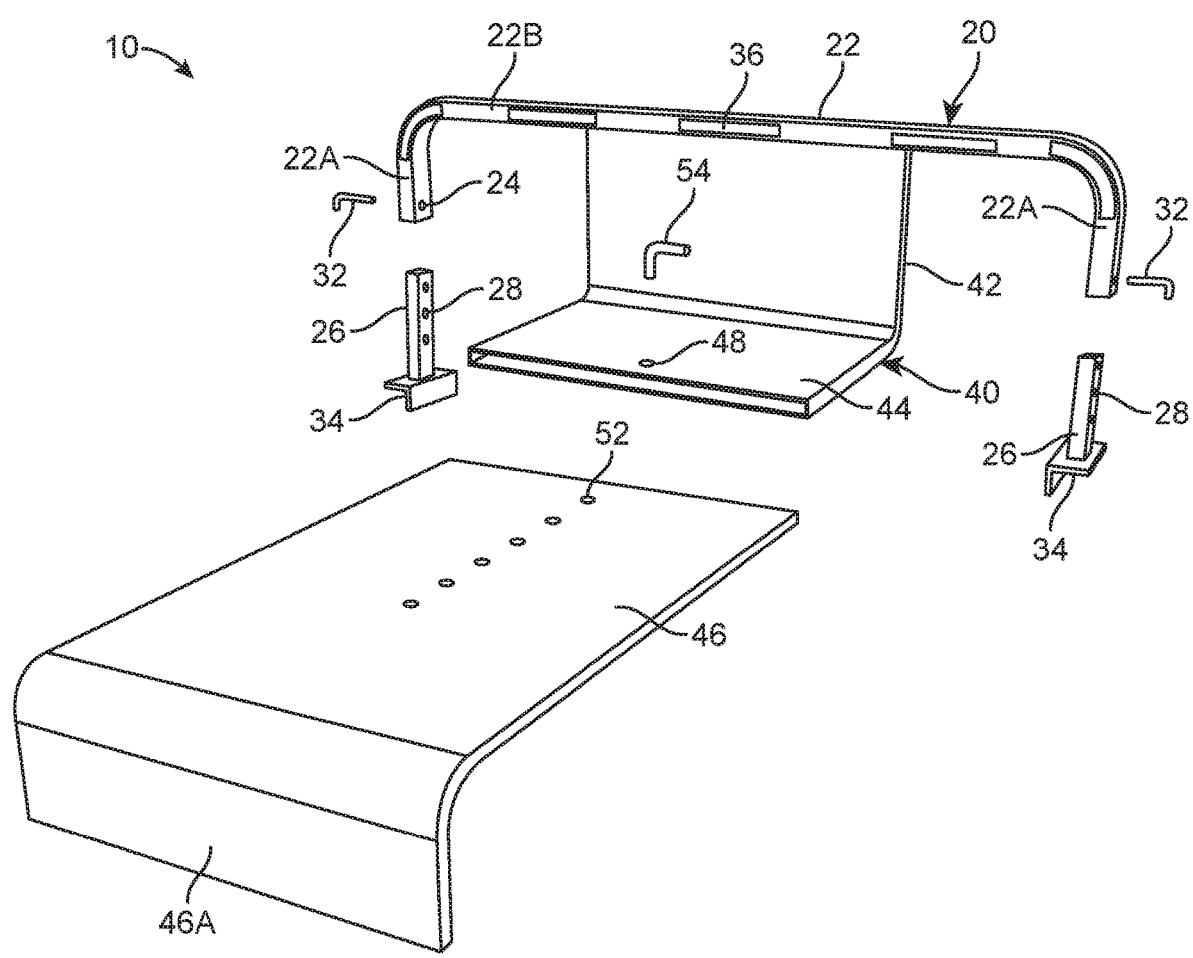
FIG. 3 illustrates an exploded view of truck bed extender 10.

As best seen in FIG. 3, first shield portion 44 may include a through hole 48 centrally located therethrough. Second shield portion 46 may include openings 52. Openings 52 may be evenly spaced apart on second shield portion 46. Openings 52 may be parallel to each other. It is to be understood that openings 52 may extend the length of second shield portion 46 on a same plane. It may be suitable for through hole 48 to be parallel with openings 52. When shield 42 has been adjusted to a proper size that accommodates load 68, through hole 48 may line up with one of openings 52. A shield pin 54 may then extend through through hole 48 and one of openings 52 to secure first shield portion 44 and second shield portion 46 together. With first shield portion 44 and second shield portion 46 secured together, load 68 may be properly secured to truck bed 64. Shield pin 54 may be L shaped, in one embodiment. Shield pin 54 may be removable from through hole 48 and openings 52 with a head of the shield pin 54 that facilitates grasping thereof. Shield pin 54 may be partially visible when securing first shield portion 44 and second shield portion 46 together.

Cargo load restraining device 10 may help to maintain load 68 secured onto truck bed 64 of vehicle 62. Cargo load restraining device 10 may be adjustable is height and length to accommodate different sized of load 68. Frame 22 may be used to secure cargo load restraining device 10 to vehicle 62. Frame 22 may permit for the present invention to be adjusted height wise. Shield 42 may assist in maintaining load 68 secured to truck bed 64 of vehicle 62. Shield 42 may permit for the present invention to be adjusted length wise. Additionally, shield 42 may provide cover to load 68 once secured onto truck bed 64. Cargo load retraining device 10 helps to increase the safety of surrounding vehicles or people by better securing load 68 onto vehicle 62 during transportation.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A system for a cargo restraining device, comprising:
   a) a vehicle assembly including a vehicle with a truck bed, said truck bed including truck bed rails, a load mounted onto said truck bed in between said truck bed rails;
   b) a frame assembly including a frame, arms slidably attached to said frame, said arms being vertically extendable from said frame and adapted to adjust a height of said frame, said arms being pivotally attached onto said truck bed rails; and
   c) a shield assembly including a shield, said shield mounted underneath of said frame, said shield defined by a first shield portion and a second shield portion, said second shield portion being slidably received within said first shield portion for adjusting a length of said shield, said shield providing coverage to said load, said shield second portion securing said load onto said truck bed.
2. The system of claim 1, wherein said frame is further defined by vertical bars and a horizontal bar, said horizontal bar extending between said vertical bars, said vertical bars extending downwardly from distal ends of said horizontal bar.

3. The system of claim 1, wherein said first shield portion is in constant abutting contact with said frame.

4. The system of claim 1, wherein said second shield portion includes a front member, said front member extending downwardly from said second shield portion, said front member being in constant abutting contact with a distal end of said load.

5. The system of claim 1, wherein said first shield portion includes a through hole centrally located thereon, said second shield portion includes openings centrally located thereon.

6. The system of claim 5, wherein said openings are on a same plane, said openings being evenly spaced apart and parallel to each other.

7. The system of claim 5, wherein a shield pin secures said first shield portion and said second shield portion together, said shield pin extends simultaneously through said through hole and one of said openings aligned together when said shield is at a desired length.

8. The system of claim 1, wherein reflectors are mounted onto said frame, said reflectors adapted for providing visibility of said frame in dark areas.

9. The system of claim 8, wherein said reflectors face towards said shield.

10. The system of claim 1, wherein said frame includes frame openings, said arms including arm openings.

11. The system of claim 10, wherein said frame openings are on lateral sides of said frame.

12. The system of claim 10, wherein said arm openings are on a same vertical plane, said arm openings being evenly spaced apart and parallel to each other.

13. The system of claim 10, wherein a frame pin secures said arms and said frame together, said frame pin extends through one of said frame openings and one of said arm openings aligned together when said frame is at a desired of said height.

14. The system of claim 1, wherein said shield extends a partial length and a partial width of said truck bed.

15. The system of claim 1, wherein said shield is entirely above said truck bed.

16. The system of claim 1, wherein said shield and said load are in constant abutting contact.

17. The system of claim 1, wherein said first shield portion is hollow, said second shield portion being solid.

18. The system of claim 1, wherein mounting members are secured to said arms entirely underneath of said arms, said mounting members securing said arms and said truck bed rails together.

19. The system of claim 1, wherein said load and said shield second portion extend beyond a perimeter of said truck bed.

* * * * *